US011836936B2

(12) United States Patent
Hao

(10) Patent No.: US 11,836,936 B2
(45) Date of Patent: Dec. 5, 2023

(54) METHOD FOR GENERATING A DIGITAL DATA SET REPRESENTING A TARGET TOOTH ARRANGEMENT

(71) Applicant: NINGBO SHENLAI MEDICAL TECHNOLOGY CO., LTD., Ningbo (CN)

(72) Inventor: Jin Hao, Chengdu (CN)

(73) Assignee: NINGBO SHENLAI MEDICAL TECHNOLOGY CO., LTD., Ningbo (CN)

( * ) Notice: Subject to any disclaimer, the term of this patent is extended or adjusted under 35 U.S.C. 154(b) by 338 days.

(21) Appl. No.: 17/465,826

(22) Filed: Sep. 2, 2021

(65) Prior Publication Data
US 2023/0063677 A1 Mar. 2, 2023

(51) Int. Cl.
*G06T 7/33* (2017.01)
*G06T 7/00* (2017.01)
*G06N 3/045* (2023.01)

(52) U.S. Cl.
CPC ............. *G06T 7/344* (2017.01); *G06N 3/045* (2023.01); *G06T 7/0012* (2013.01); *G06T 2207/20081* (2013.01); *G06T 2207/30036* (2013.01)

(58) Field of Classification Search
CPC ............ G06T 7/344; G06T 7/0012; G06T 2207/20081; G06T 2207/30036; G06N 3/045
See application file for complete search history.

(56) References Cited

U.S. PATENT DOCUMENTS

| 2002/0094509 | A1* | 7/2002 | Durbin | A61C 9/0046 433/213 |
| 2021/0322136 | A1* | 10/2021 | Anssari Moin | G16H 30/40 |

* cited by examiner

*Primary Examiner* — Casey L Kretzer
(74) *Attorney, Agent, or Firm* — Birch, Stewart, Kolasch & Birch, LLP

(57) ABSTRACT

The present application provides a computer-implemented method for generating a digital data set representing a target tooth arrangement, comprising: obtaining a first and a second 3D digital models respectively representing upper jaw teeth and lower jaw teeth under an initial tooth arrangement, where the first and the second 3D digital models are in a predetermined relative positional relationship; extracting a tooth level feature vector from each tooth of the first and second 3D digital models; preliminarily aligning the first and second 3D digital models based on the tooth level feature vectors using a trained first deep neural network; extracting a jaw level feature vector for each tooth of the preliminarily aligned first and second 3D digital models; and further aligning the preliminarily aligned first and second 3D digital models to obtain a target tooth arrangement based on the jaw level feature vectors using a trained second deep neural network.

13 Claims, 2 Drawing Sheets

100

```
┌─────────────────────────────────────────────┐
│ a first and a second 3D digital models       │
│ respectively representing upper jaw teeth    │── 101
│ and lower jaw teeth under an initial tooth   │
│ arrangement are obtained                     │
└─────────────────────────────────────────────┘
                    │
                    ▼
┌─────────────────────────────────────────────┐
│ a tooth level feature vector is extracted    │── 103
│ from each tooth of the first and second 3D   │
│ digital models                               │
└─────────────────────────────────────────────┘
                    │
                    ▼
┌─────────────────────────────────────────────┐
│ a preliminary target pose is generated for   │
│ each tooth based on its tooth level feature  │── 105
│ vector using a first deep learning neural    │
│ network                                      │
└─────────────────────────────────────────────┘
                    │
                    ▼
┌─────────────────────────────────────────────┐
│ a jaw level feature vector is extracted from │
│ the preliminarily aligned first and second   │── 107
│ 3D digital models for each tooth             │
└─────────────────────────────────────────────┘
                    │
                    ▼
┌─────────────────────────────────────────────┐
│ a data set representing a target tooth       │
│ arrangement is generated based on the jaw    │── 107
│ level feature vectors using a second deep    │
│ learning neural network                      │
└─────────────────────────────────────────────┘
```

FIG. 1

METHOD FOR GENERATING A DIGITAL DATA SET REPRESENTING A TARGET TOOTH ARRANGEMENT

FIELD OF THE APPLICATION

The present application generally relates to a method for generating a digital data set representing a target tooth arrangement.

BACKGROUND

Shell-shaped repositioners made of polymer materials become more and more popular due to their advantages on aesthetic appearance, convenience and hygiene. A set of shell-shaped repositioners usually includes a dozen of or even tens of successive shell-shaped repositioners for incrementally repositioning a patent's teeth from an initial tooth arrangement to a target tooth arrangement, where there are N successive intermediate tooth arrangements from a first intermediate tooth arrangement to a final intermediate tooth arrangement between the initial tooth arrangement and the target tooth arrangement.

A common method for fabricating shell-shaped repositioners is forming a series of successive shell-shaped repositioners over a series of successive positive models respectively using a thermoforming process. The series of successive positive models are fabricated based on a series of successive 3D digital models, respectively, which are generated based on a series of successive digital data sets representing a series of successive tooth arrangements from the first intermediate tooth arrangement to the target tooth arrangement, respectively.

A common method of obtaining the series of successive digital data sets includes: first, obtain a 3D digital model representing the initial tooth arrangement (i.e. the patient's tooth arrangement before the orthodontic treatment) by scanning, then obtain a 3D digital model representing the target tooth arrangement (i.e. the tooth arrangement to be achieved by the orthodontic treatment) by manually manipulating the 3D digital model representing the initial tooth arrangement, and then generate the series of successive intermediate tooth arrangements by interpolating based on the initial and the target tooth arrangements.

However, it is time-consuming and laborious to obtain a 3D digital model representing a target tooth arrangement by manually manipulating a 3D digital model representing an initial tooth arrangement, and it is subject to and strongly dependent on the operator's skill, as a result, it is difficult to ensure the consistency of results. In view of the above, it is necessary to provide a computer-implemented method for generating a digital data set representing a target tooth arrangement.

SUMMARY

In one aspect, the present application provides a computer-implemented method for generating a digital data set representing a target tooth arrangement, comprising: obtaining a first and a second 3D digital models respectively representing upper jaw teeth and lower jaw teeth under an initial tooth arrangement, where the first and the second 3D digital models are in a predetermined relative positional relationship; extracting a tooth level feature vector from each tooth of the first and second 3D digital models; preliminarily aligning the first and second 3D digital models based on the tooth level feature vectors using a trained first deep neural network; extracting a jaw level feature vector for each tooth of the preliminarily aligned first and second 3D digital models; and further aligning the preliminarily aligned first and second 3D digital models to obtain a target tooth arrangement based on the jaw level feature vectors using a trained second deep neural network.

In some embodiments, the predetermined relative position relationship may be occlusal state.

In some embodiments, each tooth level feature vector only contains features of a corresponding single tooth in the first and second 3D digital models, each jaw level feature vector not only contains features of a corresponding single tooth but also features of other teeth in the preliminarily aligned first and second 3D digital models.

In some embodiments, each tooth level feature vector is generated based on features extracted from a 3D digital model of a corresponding single tooth, each jaw level feature vector is generated based on features extracted from the preliminarily aligned first and second 3D digital models as a whole and is centered on a corresponding tooth.

In some embodiments, the features may comprise central points and normal vectors of facets.

In some embodiments, the first deep neural network may be based on DGCNN, and the tooth level features are extracted using DGCNN feature extraction modules.

In some embodiments, the second deep neural network is an attention based deep neural network.

In some embodiments, the second deep neural network may be based on Transformer.

In some embodiments, the jaw level features may be extracted using a DGCNN feature extraction module.

In some embodiments, the method may further comprise: generating a preliminary transformation matrix for each tooth based on its tooth level feature vector using the first deep neural network; preliminarily aligning the first and second 3D digital models by applying the preliminary transformation matrices on corresponding teeth of the first and second 3D digital models; generating a final transformation matrix for each tooth based on its jaw level feature vector using the second deep neural network; and further aligning the preliminarily aligned first and second 3D digital models by applying the final transformation matrices on corresponding teeth of the preliminarily aligned first and second 3D digital models.

In some embodiments, each of loss functions used in the training of the first and the second deep neural networks may comprise two components: a rotation loss and a translation loss.

In some embodiments, the first and the second deep neural networks may be trained using a same training set.

In some embodiments, the first deep neural network comprises multiple parallel models each of which corresponds to one tooth.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

FIG. 1 is a schematic flowchart of a computer-implemented method for generating a digital data set representing a target tooth arrangement.

DETAILED DESCRIPTION OF ILLUSTRATED EMBODIMENTS

Figure 2:
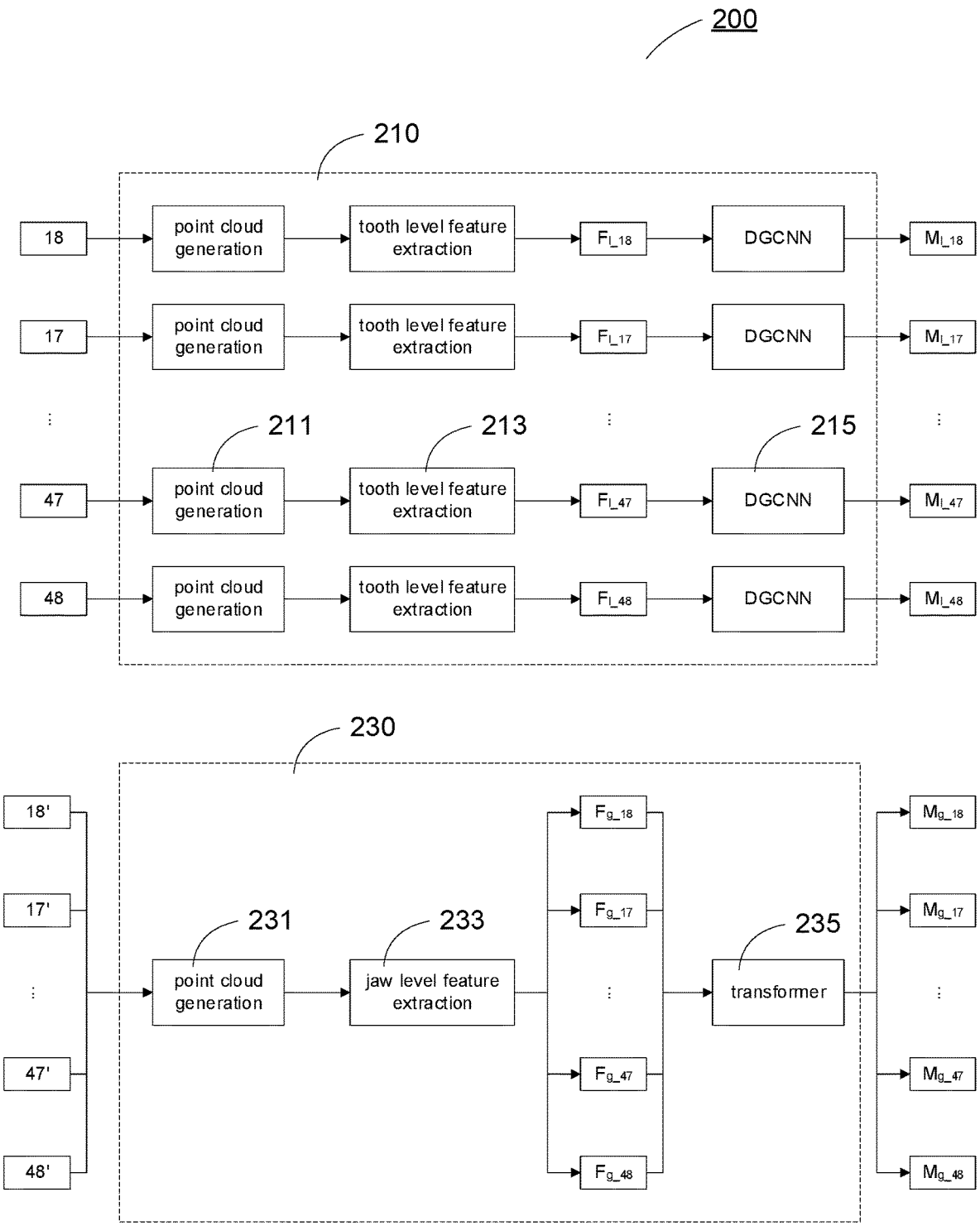
FIG. 2 schematically illustrates the structure of a recurrent neural network in one embodiment of the present application.

In the following detailed depiction, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

A Transformer is a deep neural network based entirely on self-attention. Transformers are widely used in the field of natural language processing such as machine translation etc. due to its superior performance on modeling relationships between entities.

Poses of aligned teeth of a human being are strongly correlated to each other, pose of one tooth may affect poses of neighboring teeth and even other teeth, where pose of a tooth describes position and orientation of the tooth in 3D space. The Inventors of the present application discovered after extensive tests that a Transformer is able to learn characteristics of relative positional relationships between aligned teeth, and can be used to improve relative positional relationships between teeth preliminarily aligned by another deep neural network which has advantage on learning characteristics of target poses of individual teeth. A target pose of a tooth is the pose of the tooth under a target tooth arrangement. Test results show that combination of such two deep neural networks with complementary advantages has very good performance on predicting target tooth arrangement.

One aspect of the present application provides a method for generating a digital data set representing a target tooth arrangement using two deep neural networks, where a first neural network predicts target poses of teeth individually based on tooth level feature vectors, and a second neural network improves relative positional relationships between the preliminarily aligned teeth based on jaw level feature vectors.

In one embodiment, a digital data set representing a target tooth arrangement may be a set of coordinates of teeth under the target tooth arrangement. In another embodiments, a digital data set representing a target tooth arrangement may be a 3D digital model of teeth under the target tooth arrangement.

Dental orthodontic treatment is a process of repositioning teeth from an initial tooth arrangement to a target tooth arrangement. It is understood that a target tooth arrangement is a tooth arrangement to be achieved by an orthodontic treatment; an initial tooth arrangement may be a patient's tooth arrangement before orthodontic treatment, or a patient's current tooth arrangement based on which a target tooth arrangement is generated.

FIG. 1 shows a schematic flowchart of a computer-implemented method 100 for generating a digital data set representing a target tooth arrangement in one embodiment of the present application.

In one embodiment, to better positional relationships between upper jaw teeth and lower jaw teeth under an obtained target tooth arrangement, the upper teeth and lower jaw teeth may be processed as a whole, and positional relationships between the upper jaw teeth and lower jaw teeth can be taken into consideration in the prediction of the target tooth arrangement.

In 101, a first 3D digital model and a second 3D digital model respectively representing upper jaw teeth and lower jaw teeth under an initial tooth arrangement are obtained.

In one embodiment, a 3D digital model of teeth on a jaw under an initial tooth arrangement may be obtained by directly scanning a patient's jaw. In another embodiment, the 3D digital model of the teeth under the initial tooth arrangement may be obtained by scanning a mockup of the patient's jaw such as a plaster model. In a further embodiment, the 3D digital model of the teeth under the initial tooth arrangement may be obtained by scanning an impression of the patient's jaw.

In one embodiment, after the 3D digital model representing the teeth under the initial tooth arrangement is obtained, the 3D digital model may be segmented such that the teeth in the 3D digital model are independent of each other so that each tooth in the 3D digital model may be moved/manipulated individually.

FIG. 2 is a schematic block diagram of a system 200 for generating a digital data set representing a target tooth arrangement in one embodiment of the present application. The system 200 mainly includes: a first deep neural network 210 to predict target poses of teeth individually, and a second deep neural network 230 to adjust relative positional relationships between the preliminarily aligned teeth. In one embodiment, the first deep neural network may be Dynamic Graph CNN (hereinafter "DGCNN"), and the second deep neural network may be based on Transformer. The method 100 will be described in detail below with reference to FIG. 1 and FIG. 2.

In 103, a tooth level feature vector is extracted from each tooth of the first and second 3D digital models.

If there is no missing tooth, a human being usually has 32 teeth, with 16 teeth on each of the upper and lower jaws. In one embodiment, the teeth may be sequentially numbered to facilitate processing. In one embodiment, the teeth may be numbered in an 8-8 manner, i.e., the upper jaw teeth may be numbered in a sequence of 18, 17 . . . 12, 11, 21, 22 . . . 27, 28 from left to right, and the lower jaw teeth may be numbered in a sequence of 38, 37 . . . 32, 31, 41, 42 . . . 47, 48 from left to right.

Because the first deep neural network 210 is to predict target poses of teeth individually, it may include 32 models, each of which corresponds to one tooth. These models may share the same structure.

In one embodiment, the first deep neural network 210 is based on DGCNN, each model of the first deep neural network 210 may include a point cloud generation module 211, a tooth level feature extraction module 213 and a DGCNN module 215, where the tooth level feature extraction module 213 is a DGCNN feature extraction module, and the DGCNN module 215 is a deep neural network based on Multi-Layer Perceptron (hereinafter "MLP"), where the tooth level feature extraction module 213 and the DGCNN module 215 constitute a complete DGCNN network.

3D digital model of each tooth of the first and the second 3D digital models is input to the corresponding point cloud generation module 211, where each of the numbers 18, 17 . . . 47, 48 in FIG. 2 represents a 3D digital model of a corresponding single tooth in the first and second 3D digital models. The point cloud generation module 211 may evenly sample a first predetermined number of facets (for example, 512 facets, it is understood that this number may be adjusted) on a single tooth 3D digital model, and then may extract from each sampled facet features including central point and normal vector of the facet, to generate a point cloud of the tooth. If the number of facets of a 3D digital model of a single tooth is less than the first predetermined number, repeated sampling may be performed to obtain the first predetermined number of sampled facets.

Then each point cloud is input to the corresponding tooth level feature extraction module 213, which generates a corresponding tooth level feature vector $F_{l\_t}$, where t stands for the number of the tooth.

In 105, preliminary target pose of each tooth is predicted based on its tooth level feature vector.

In one embodiment, each tooth level feature vector is input to a corresponding trained DGCNN module 215, which predicts a preliminary transformation matrix $M_{l\_t}$. After each tooth in the first and the second 3D digital models is transformed with its corresponding preliminary transformation matrix, the first and the second 3D digital models are preliminarily aligned i.e. close to real target tooth arrangement.

In 107, a jaw level feature vector is extracted for each tooth based on the preliminarily aligned first and second 3D digital models.

To take relative position relationships between upper jaw teeth and lower jaw teeth into consideration in generation of a digital data set representing a target tooth arrangement, each pair of 3D digital models respectively representing upper jaw teeth and corresponding lower jaw teeth are in a predetermined relative positional relationship. In one embodiment, the predetermined relative positional relationship may be occlusal state (upper jaw teeth and lower jaw teeth are closed). Inspired by the present application, it is understood that besides occlusal state, the predetermined relative positional relationship may be any other suitable relative positional relationships, for example, a positional relationship obtained by moving one of the two jaws, which are in occlusal state, from the other by a predetermined distance toward a predetermined direction. When relative positional relationships between upper jaw teeth and lower jaw teeth are taken into consideration in the generation of a digital data set representing a target tooth arrangement, relative positional relationships between the upper jaw teeth and the lower jaw teeth under the resultant target tooth arrangement are more ideal. In the following examples, unless otherwise specifically specified, each pair of 3D digital models of upper jaw teeth and lower jaw teeth are in occlusal state.

In one embodiment, the second deep neural network 230 is based on Transformer. The second deep neural network 230 includes a point cloud generation module 231, a jaw level feature extraction module 233 and a Transformer module 235, where the point cloud generation module 231 may share the same structure with the point cloud generation module 211, and the jaw level feature extraction module 233 may share the same structure with the tooth level feature extraction module 213.

The preliminarily aligned first and second 3D digital data models as a whole are input to the point cloud generation module 231 to generate an overall point cloud, where each of the numbers 18', 17' . . . 47', 48' in FIG. 2 represents a 3D digital model of a corresponding single tooth in the preliminarily aligned first and second 3D digital models. The overall point cloud may be generated using the same method as the above.

Then the overall point cloud is input to the jaw level feature extraction module 233, to generate for each tooth a jaw level feature vector $F_{g\_t}$, which is a global feature vector centered on the current tooth #t. Compared with a jaw level feature vector, a tooth level feature vector may be regarded as a local feature vector.

In 109, a digital data set representing target tooth arrangement is generated based on the jaw level feature vectors.

In one embodiment, the jaw level feature vectors are input to the trained Transformer 235, and a final transformation matrix $M_{g\_t}$ is generated for each tooth based on these jaw level feature vectors. A third and a fourth 3D digital models respectively representing the upper jaw teeth and the lower jaw teeth under target tooth arrangement may be generated by further transforming the teeth of the preliminarily aligned first and second 3D digital models with corresponding final transformation matrices.

In one embodiment, the first deep neural network 210 and the second deep neural network 230 may be trained separately with a same training set.

In one embodiment, a training set may include multiple sets of data, and each set of data may include 3D digital models of upper jaw teeth and lower jaw teeth in occlusal state under their initial tooth arrangements and 3D digital models of the upper jaw teeth and the lower jaw teeth in occlusal state under their target tooth arrangements. It is understood that a target tooth arrangement is equivalent to a corresponding transformation matrix because the teeth under the target tooth arrangement may be obtained by transforming the teeth under the initial tooth arrangement using the transformation matrix, therefore the transformation matrix may also be regarded as a digital data set representing the target tooth arrangement.

In another embodiment, the first deep neural network 210 and the second deep neural network 230 may be trained as a whole, where the output data of the first deep neural network 210 may be used as the input data of the second deep neural network 230 in the training.

In one embodiment, a transformation matrix may include a rotation matrix and a translation matrix.

In one embodiment, a loss function employed in the training of the first deep neutral network 210 and the second deep neutral network 230 may include two components: one is a rotation loss marked as $R_{loss}$, which indicates a difference between a predicted rotation matrix and a ground truth (i.e. a rotation matrix in a training set); the other is a translation loss marked as $T_{loss}$, which indicates a difference between a predicted translation matrix and a ground truth. Therefore, the loss function may be written as the following Equation (1):

$$\text{Loss} = a*R_{loss} + b*T_{loss} \qquad \text{Equation (1)}$$

where a and b stand for the weights of $R_{loss}$ and $T_{loss}$, respectively. In one example, a and b may be given the value 10 and 1.

In one embodiment, the loss function may be mean squared error loss function.

It is understood that instead of transformation matrices, the system 200 may be modified to directly generate/predict the poses (coordinates) of teeth under the target tooth arrangements.

Inspired by the present application, besides DGCNN, the first deep neural network 210 may be based on other suitable neural networks for processing point cloud, mesh, voxel grid or graph data, for example, PointNet, PointNet++, PointCNN, MeshCNN, 3DCNN, SparseCNN and Point Voxel CNN etc.

In one embodiment, the jaw level feature extraction module 233 and the tooth level feature extraction module 213 may be feature extraction modules having the same structure, for example, both of them may be DGCNN feature extraction modules, or feature extraction modules of the neural networks listed above. In another embodiment, the jaw level feature extraction module 233 and the tooth level feature extraction module 213 may be feature extraction modules having different structures, for example, the tooth level feature extraction module 213 may be DGCNN feature extraction module and the jaw level feature extraction module 233 may be PointNet feature extraction module.

Inspired by the present application, besides Transformer, the second deep neural network may be based on other suitable attention based neural networks or Graph neural networks.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

I claim:

1. A computer-implemented method for generating a digital data set representing a target tooth arrangement, comprising:
    obtaining a first and a second 3D digital models respectively representing upper jaw teeth and lower jaw teeth under an initial tooth arrangement, where the first and the second 3D digital models are in a predetermined relative positional relationship;
    extracting a tooth level feature vector from each tooth of the first and second 3D digital models;
    preliminarily aligning the first and second 3D digital models based on the tooth level feature vectors using a trained first deep neural network;
    extracting a jaw level feature vector for each tooth of the preliminarily aligned first and second 3D digital models; and
    further aligning the preliminarily aligned first and second 3D digital models to obtain a target tooth arrangement based on the jaw level feature vectors using a trained second deep neural network.

2. The method of claim 1, wherein the predetermined relative position relationship is occlusal state.

3. The method of claim 1, wherein each tooth level feature vector only contains features of a corresponding single tooth in the first and second 3D digital models, each jaw level feature vector not only contains features of a corresponding single tooth but also features of other teeth in the preliminarily aligned first and second 3D digital models.

4. The method of claim 1, wherein each tooth level feature vector is generated based on features extracted from a 3D digital model of a corresponding single tooth, each jaw level feature vector is generated based on features extracted from the preliminarily aligned first and second 3D digital models as a whole and is centered on a corresponding tooth.

5. The method of claim 4, wherein the features comprise central points and normal vectors of facets.

6. The method of claim 1, wherein the first deep neural network is based on DGCNN, and the tooth level features are extracted using DGCNN feature extraction modules.

7. The method of claim 1, wherein the second deep neural network is an attention based deep neural network.

8. The method of claim 7, wherein the second deep neural network is based on Transformer.

9. The method of claim 7, wherein the jaw level features are extracted using a DGCNN feature extraction module.

10. The method of claim 1, further comprising:
    generating a preliminary transformation matrix for each tooth based on its tooth level feature vector using the first deep neural network;
    preliminarily aligning the first and second 3D digital models by applying the preliminary transformation matrices on corresponding teeth of the first and second 3D digital models;
    generating a final transformation matrix for each tooth based on its jaw level feature vector using the second deep neural network; and
    further aligning the preliminarily aligned first and second 3D digital models by applying the final transformation matrices on corresponding teeth of the preliminarily aligned first and second 3D digital models.

11. The method of claim 1, wherein each of loss functions used in the training of the first and the second deep neural networks comprises two components: a rotation loss and a translation loss.

12. The method of claim 1, wherein the first and the second deep neural networks are trained using a same training set.

13. The method of claim 1, wherein the first deep neural network comprises multiple parallel models each of which corresponds to one tooth.

* * * * *